US012680422B2

(12) United States Patent
Bi et al.

(10) Patent No.: US 12,680,422 B2
(45) Date of Patent: Jul. 14, 2026

(54) METHOD FOR POWERING WITH A HYBRID BATTERY PACK SYSTEM

(71) Applicant: CNPC USA Corporation

(72) Inventors: Wu Bi, Katy, TX (US); Xu Wang, Beijing (CN); Peng Cheng, Sugar Land, TX (US); Jiaxiang Ren, Houston, TX (US)

(73) Assignee: CNPC USA Corporation, Houston, TX (US)

( * ) Notice: Subject to any disclaimer, the term of this patent is extended or adjusted under 35 U.S.C. 154(b) by 405 days.

(21) Appl. No.: 18/405,989

(22) Filed: Jan. 5, 2024

(65) Prior Publication Data

US 2024/0141759 A1    May 2, 2024

Related U.S. Application Data

(62) Division of application No. 17/378,722, filed on Jul. 18, 2021, now Pat. No. 11,905,799.

(51) Int. Cl.

| | |
|---|---|
| *H01M 10/052* | (2010.01) |
| *E21B 41/00* | (2006.01) |
| *E21B 47/07* | (2012.01) |
| *H01M 4/587* | (2010.01) |
| *H01M 10/0567* | (2010.01) |

(Continued)

(52) U.S. Cl.
CPC .......... *E21B 41/0085* (2013.01); *E21B 47/07* (2020.05); *H01M 4/587* (2013.01); *H01M 10/052* (2013.01); *H01M 10/0567* (2013.01); *H01M 10/0569* (2013.01); *H01M 10/4207*

(2013.01); *H01M 10/425* (2013.01); *H01M 10/486* (2013.01); *H01M 50/204* (2021.01); *H01M 50/296* (2021.01); *H02J 7/80* (2026.01); *H02J 7/855* (2026.01); *H02J 7/977* (2026.01); *H01M 2010/4271* (2013.01); *H01M 2200/108* (2013.01); *H01M 2220/10* (2013.01); *H01M 2300/0037* (2013.01)

(58) Field of Classification Search
CPC .. H01M 50/204; H01M 50/296; H01M 50/30; H01M 10/0525; H01M 4/587
See application file for complete search history.

(56) References Cited

U.S. PATENT DOCUMENTS

| | | | |
|---|---|---|---|
| 6,045,941 | A | 4/2000 | Milewits |
| 8,067,108 | B1 | 11/2011 | Johnson |

(Continued)

*Primary Examiner* — Kenneth J Douyette
(74) *Attorney, Agent, or Firm* — Craft Chu PLLC; Andrew W. Chu

(57) ABSTRACT

The hybrid battery system includes a primary battery pack, a secondary battery pack, a battery control unit, a battery pack positive terminal, and a battery pack negative terminal. The battery control unit includes a management module and a variable resistor. The primary battery pack supplies power at lower temperatures, while the secondary battery pack supplies power at higher temperatures. The primary battery pack is unsafe at higher temperatures, and the primary cells within the primary battery pack are modified to mitigate the dangers that previously rendered the primary battery pack unusable in a hybrid battery pack at higher temperatures. The invention includes the method of safely operating the hybrid battery system with the modified primary battery cells of the primary battery pack.

10 Claims, 3 Drawing Sheets

(51) Int. Cl.

| | |
|---|---|
| *H01M 10/0569* | (2010.01) |
| *H01M 10/42* | (2006.01) |
| *H01M 10/48* | (2006.01) |
| *H01M 50/204* | (2021.01) |
| *H01M 50/296* | (2021.01) |
| *H02J 7/00* | (2006.01) |
| *H02J 7/80* | (2026.01) |
| *H02J 7/90* | (2026.01) |

(56) References Cited

U.S. PATENT DOCUMENTS

| | | | |
|---|---|---|---|
| 8,997,875 B2 | 4/2015 | Bennett et al. | |
| 9,118,045 B2 | 8/2015 | Marshall et al. | |
| 10,145,210 B2 | 12/2018 | Kruspe | |
| 10,199,659 B2 | 2/2019 | Navarro | |
| 10,590,746 B2 | 3/2020 | Burky | |
| 2010/0114236 A1* | 5/2010 | Jiang | H02J 7/0063 |
| | | | 607/35 |
| 2013/0244063 A1* | 9/2013 | Dhar | B60L 50/64 |
| | | | 429/149 |
| 2019/0031644 A1 | 1/2019 | Montoya | |
| 2020/0009584 A1 | 1/2020 | Signorelli | |

* cited by examiner

US 12,680,422 B2

1

METHOD FOR POWERING WITH A HYBRID BATTERY PACK SYSTEM

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to a limited power supply. More particularly, the present invention relates to a battery system that supplies safe and sufficient power over an extended temperature range. Even more particularly, the present invention relates to hybrid battery packs with power management for safe operation at downhole temperature conditions.

2. Description of Related Art Including Information Disclosed Under 37 CFR 1.97 and 37 CFR 1.98

Conventional lithium batteries have a negative electrode or anode as an alkaline metal, that is, lithium. Other alkaline earth metals, mixtures and alloys are also possible. The positive electrode or cathode is a carbon electrode, which is porous and contains carbon black and inert polymer binders. The battery electrolyte solution can include liquid thionyl chloride, which is a typical energy active material reacted on the carbon electrode. Other energy active materials can be liquid sulfuryl chloride or sulfur dioxide in the battery electrolyte solution, or sulfur particles mixed in the carbon electrode. A porous carbon electrode provides reaction sites for energy active material reactions and is directly connected to current collector for electricity on the battery positive side. In the prior art, there are wide application ranges and energy densities for the known lithium thionyl chloride battery, the lithium sulfuryl chloride battery, the lithium sulfur dioxide battery, and the lithium sulfur battery.

Lithium thionyl chloride batteries are used in the oil and gas industry, aerospace, and memory backup power devices. The lithium thionyl chloride battery is selected for these applications due to their functionality through a wide temperature range, from −40° C. to about 165° C. The lithium metal in the negative electrode has a melting pointing of 180° C., which limits the upper operating temperature of the overall battery. Thus, lithium alloys, such as LixMg(1−x) (0<x<1) or other types of metals, such as calcium, can be substituted in order to increase maximum operating temperature. However, the selection of material can be complicated. Adding magnesium to make an alloy with lithium in the negative electrode or anode or substituting an alkaline earth metal, like calcium, results in poor battery performance around and below room temperature.

Various patents and publications have acknowledged the problem of the temperature range limitations of lithium, including US Publication No. 2020/0095847, published on 26 Mar. 2020 for Signorelli. Doubling the number anodes and cathodes or carbon electrodes combines the functionality of two overlapping batteries. See U.S. Pat. No. 6,045,941, issued on 4 Apr. 2000 to Milewits, and U.S. Pat. No. 9,118,045, issued on 25 Aug. 2015 to Marshall et al.

The prior art also includes power management for hybrid battery systems to control power supply and distribution between two different battery cells in one battery under different conditions, including US Publication No. 2019/0316446, published on 17 Oct. 2019 for Montoya, U.S. Pat. No. 10,145,210, issued on 4 Dec. 2018 for Kruspes, U.S. Pat. No. 10,199,659, issued on 5 Feb. 2019 to Navarro, U.S. Pat. No. 10,590,746, issued on 17 Mar. 2020 to Burky, U.S. Pat. No. 8,997,875, issued on 7 Apr. 2015 to Bennett et al., and U.S. Pat. No. 8,067,108, issued on 29 Nov. 2011 to Johnson. The typical trigger has been temperature. At higher temperatures, one battery is switched off, and another battery is switched on. The switch can require removal of the tool from the borehole in order to replace the one battery with another battery. In the oil and gas industry, switching out batteries is not so simple. The drilling must stop. The drill string must be pulled out of the hole. The tool components must switch out battery packs to proceed deeper. Everything must be reset and restarted. Other switches allow the hybrid battery pack to remain downhole. However, lithium metal melts at 180 deg C., so the battery must operate lower than 180 deg C. Melted lithium destroys its outer protective layer, and liquid lithium reacts explosively with oxyhalide. Allowing lithium to remain at the higher temperatures is a safety hazard.

It is an object of the present invention to provide a power supply for an extended temperature range.

It is an object of the present invention to provide a battery system for a downhole tool under all downhole temperature conditions.

It is another object of the present invention to provide a hybrid battery pack system with a primary battery pack with a lower practical capacity of electrode metal than cathodic solution.

It is another object of the present invention to provide a hybrid battery pack system with a primary battery pack having primary battery cells with greater headspace than secondary battery cells of a secondary battery pack.

It is an object of the present invention to provide a hybrid battery pack system with power management for safe operation in downhole conditions.

It is another object of the present invention to provide a hybrid battery pack system with a control unit and variable resistor loads to management a primary battery pack and a secondary battery pack.

It is another object of the present invention to provide power management of a hybrid battery pack system to strip a negative anode of a primary battery pack before temperature exceeds a primary rated temperature range.

These and other objectives and advantages of the present invention will become apparent from a reading of the attached specification, drawings and claims.

BRIEF SUMMARY OF THE INVENTION

Embodiments of the present invention includes a hybrid battery pack system and method for supplying power to a downhole tool from the hybrid battery pack over an extended temperature range. The hybrid battery system includes a primary battery pack and a secondary battery pack. The primary battery pack is compatible with lower temperatures, but extremely dangerous at higher temperatures. The primary battery pack cannot be safely used at borehole temperatures above the melting point of the negative electrode metal. The primary battery pack is modified in the present invention to remain safe at the higher temperatures and compatible with the secondary battery pack to supply continuous power over lower to higher temperatures, which correspond to a downhole tool proceeding deeper into a borehole being drilled. The hybrid battery system remains stable, even if the primary battery pack has stopped discharging voltage. The hybrid battery system can includes a lithium-oxyhalide battery as the primary battery pack and a lithium alloy-oxyhalide battery as the secondary battery pack. The primary battery pack remains safe at temperatures above the melting point of the primary electrode metal and above the primary rated temperature range. The secondary battery pack remains safe at temperatures below the secondary rated temperature range, even when insufficient power is provided at temperatures below the secondary rated temperature range. The hybrid battery system of the present invention enables these previously flawed battery packs in a single, safe and reliable combination.

The hybrid battery system includes a primary battery pack, a secondary battery pack, a battery control unit being in communication with the primary battery pack and the secondary battery pack, a battery pack positive terminal connected to the battery control unit, and a battery pack negative terminal connected to the battery control unit. The battery control unit can be comprised of a management module and a variable resistor.

An embodiment of the primary battery pack is comprised of a primary negative terminal and a primary positive terminal. The primary battery pack further includes at least one primary first battery cell with a primary first negative terminal connected to the primary negative terminal and a primary first positive terminal connected to the primary positive terminal. The primary battery pack also includes a primary first negative electrode being comprised of a primary first electrode metal, a primary first carbon electrode, and a primary first separator between the primary first negative electrode and the primary first carbon electrode. There is a primary first cathodic solution within the primary first battery cell and in contact with the primary first negative electrode, the primary first separator, and the primary first carbon electrode. The primary first cathodic solution comprises a primary first solvent system and a primary first electrolyte salt.

An embodiment of the secondary battery pack is comprised of a secondary negative terminal and a secondary positive terminal. The secondary battery pack further includes at least one secondary first battery cell with a secondary first negative terminal connected to the secondary negative terminal and a secondary first positive terminal connected to the secondary positive terminal. The secondary battery pack also includes a secondary first negative electrode being comprised of a secondary first electrode metal, a secondary first carbon electrode, and a secondary first separator between the secondary first negative electrode and the secondary first carbon electrode. There is a secondary first cathodic solution within the secondary first battery cell and in contact with the secondary first negative electrode, the secondary first separator, and the secondary first carbon electrode. The secondary first cathodic solution comprises a secondary first solvent system and a secondary first electrolyte salt.

The hybrid battery system includes the primary battery pack with one primary first battery cell and additional primary cells. The cells are modular. There can be a primary first battery cell and a primary second battery cell connected in series or parallel or combination of both. The primary first battery cell and the primary second battery cell are modular so as to be interchangeable with each other and have the same relationships to the secondary first battery cell. The secondary battery pack with one secondary first battery cell can also have additional secondary cells. There can be a secondary first battery cell and a secondary second battery cell connected in series or parallel or a combination of both. All of the secondary cells have the same relationships to the primary cells and can also be modular.

Embodiments of the present invention include the primary battery pack with particular relatedness to the secondary battery pack in order to operate safely. The secondary first rated temperature range is higher than the primary first rated range. The primary first electrode metal charge capacity is lower than the primary first positive charge capacity. Additionally, the primary first battery cell is comprised of a primary first battery housing with a primary first battery headspace, and the secondary first battery cell is comprised of a secondary first battery housing with a secondary first battery headspace. The primary first battery headspace is greater than the secondary first battery headspace. The safety and efficacy of the hybrid battery system is assured by the relationships between the primary battery pack relative to the secondary battery pack. The primary battery pack has the lower primary first rated temperature range, which can correspond to an alkaline metal or an alkaline earth metal as the primary first negative electrode. The secondary battery pack has the higher secondary first rated temperature range, which can correspond to an alkaline metal alloy or an alkaline earth metal alloy or alkaline metal-alkaline earth metal alloy as the secondary first negative electrode.

Alternative embodiments of the present invention include a co-solvent with a boiling point higher than 150 deg C. and inert reactivity with the primary negative electrode. The co-solvent can raise the boiling point of the primary first cathodic solution so that internal pressure of the primary cell is reduced at temperatures above the primary rated temperature range. The inert reactivity of the co-solvent dilutes cathodic solution allowing any remaining primary first electrode metal at these higher temperatures to be maintained stable in the primary first battery cell.

The method for powering an external device on a downhole tool, such as a measure while drilling (MWD) sensor is also an embodiment of the present invention. The method includes connecting the external device to the hybrid battery system and measuring a monitored temperature of the hybrid battery system. The method includes generating a primary first voltage discharge level by the primary first battery cell, when the monitored temperature is within the primary first rated temperature range; and generating a secondary first voltage discharge level by the secondary first battery cell, when the monitored temperature is within the secondary first rated temperature range.

As the downhole tool is deployed into a borehole, the monitored temperature will increase. Instead of switching off or releasing the primary battery pack to return to the surface, the method of the present invention disconnects the primary battery pack from the external device, connects to the variable resistor and increases resistance of the variable resistor to the primary battery pack with the management module before the monitored temperature is greater than the primary first rated temperature range. The method includes stripping the primary battery pack for safety, instead of simply being switched off. The resistance of the variable resistor can be increased as the monitored temperature approaches the higher end of the primary first rated temperature range. The amount of increase can depend on how quickly the monitored temperature is reaching the end of the primary first rated temperature range. The downhole tool may also be slowed from lowering further into the borehole (and higher temperatures downhole) so that the step of stripping can be completed before the downhole tool can continue lowering into the borehole.

After step of stripping the primary first electrode metal, the next step is disconnecting the primary battery pack from the variable resistor, when the primary first battery cell is fully discharged. That is, there is no longer any primary first electrode metal remaining to cause any danger. Alternatively, it is unlikely to remove all primary first electrode metal. Thus, in another embodiment, the next step is storing any residual primary first electrode metal with the primary first cathodic solution. The present invention includes the primary battery cell with increased primary first battery headspace, which tolerates higher internal pressure due to any heat release from the reaction between any stored residual primary first electrode metal and the primary first cathodic solution. These additional measures allow the safe continuation of the primary battery pack in the hybrid battery system, even when the monitored temperature is above the primary first melting point.

Embodiments of the method of the present invention include managing the power supply according to voltage discharge, not just monitored temperature. The method can include decreasing the primary first voltage discharge level from greater than 2.0V. In embodiments with a primary first battery cell and a primary second battery cell or more primary battery cells, the method includes managing the power supply according to average primary voltage level of multiple primary battery cells. This step occurs if the primary battery pack simply runs out of power, even though the monitored temperature remains within the primary first rated temperature range. In this related embodiment, there is still primary first electrode metal remaining, even though useful power is no longer being generated. For safety, this primary first electrode metal still needs to be removed. Thus, the related method includes connecting and further increasing resistance of the variable resistor with the management module when the primary first voltage discharge level is less than 2.0V, and stripping the primary first electrode metal from the primary first battery cell when the primary first voltage discharge level is less than 2.0V. A primary battery pack that has been drained of effective voltage discharge must be further processed to a safe and stable state, even if the monitored temperature remains within the primary first rated temperature range.

The method can include repeating the steps for more than one cell in each battery pack. When the primary battery pack is comprised of a primary first battery cell, a primary second battery cell, etc, then the steps are concurrent for each primary battery cell. For example, the step of generating a primary first voltage discharge level by reactions with the primary first electrode metal and the primary first cathodic solution, when the monitored temperature is within the primary first activity temperature range is repeated as generating a primary second voltage discharge level by reactions with the primary second electrode metal and the primary second cathodic solution, when the monitored temperature is within the primary second activity temperature range. The method can include combined steps for the primary battery pack, instead of individual primary battery cells. For example, increasing resistance of the variable resistor with the management module when the average primary voltage level of multiple primary battery cells is less than 2.0V. Similarly, when the secondary battery pack is comprised of a secondary first battery cell, a secondary second battery cell, etc., then the steps of the method can be concurrent for each secondary battery cell or combined for the secondary battery pack.

DETAILED DESCRIPTION OF THE INVENTION

Referring to FIGS. 1-4, the present invention is a hybrid battery pack system and method for supplying power to a downhole tool from the hybrid battery pack over an extended temperature range. As the downhole tool is deployed, the downhole conditions rise in temperature, so two types of battery packs are needed to supply sufficient power as the borehole temperatures start relatively low and increase. One battery pack is compatible with lower temperatures, while the other battery pack is compatible with higher temperatures. Safety is a major concern because the battery pack compatible with lower temperatures will remain traveling downhole as part of the hybrid battery pack system, even as the temperatures rise. The battery components must be stable, even if the battery pack compatible with lower temperatures has stopped discharging voltage.

Figure 1:
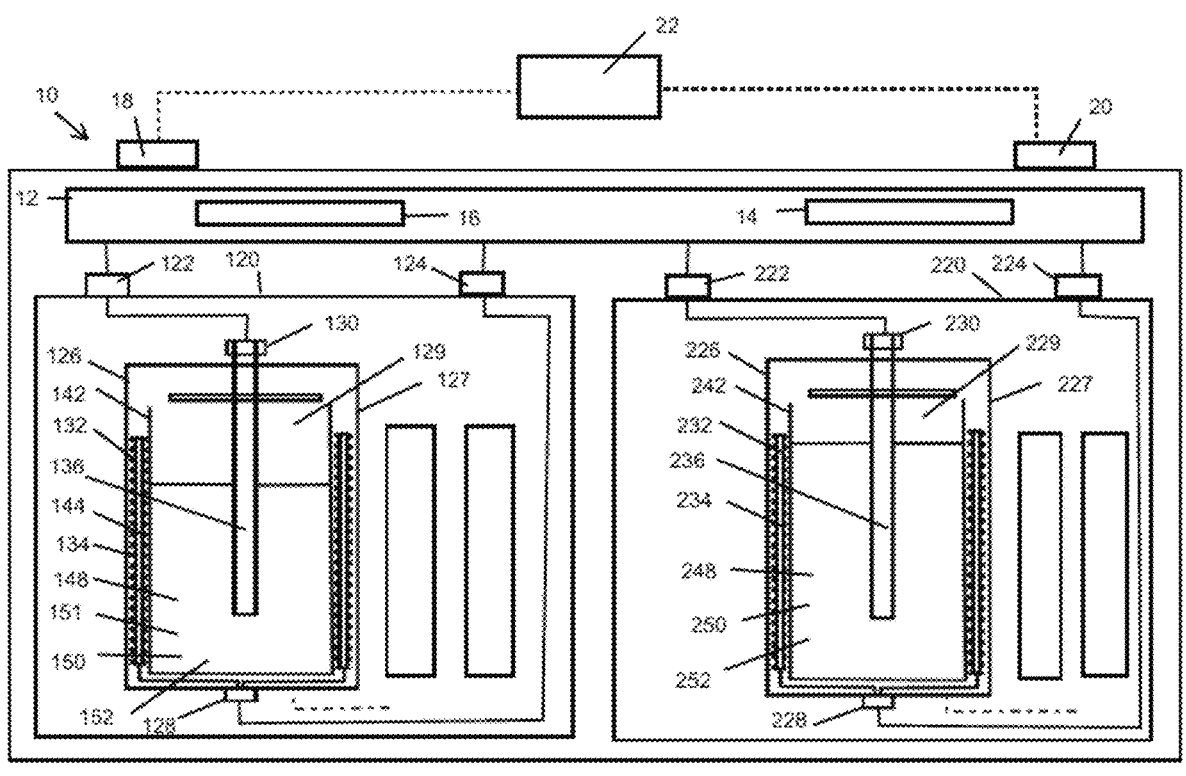
FIG. 1 is a schematic view of an embodiment of the present invention for a hybrid battery pack system.
Figure 3:
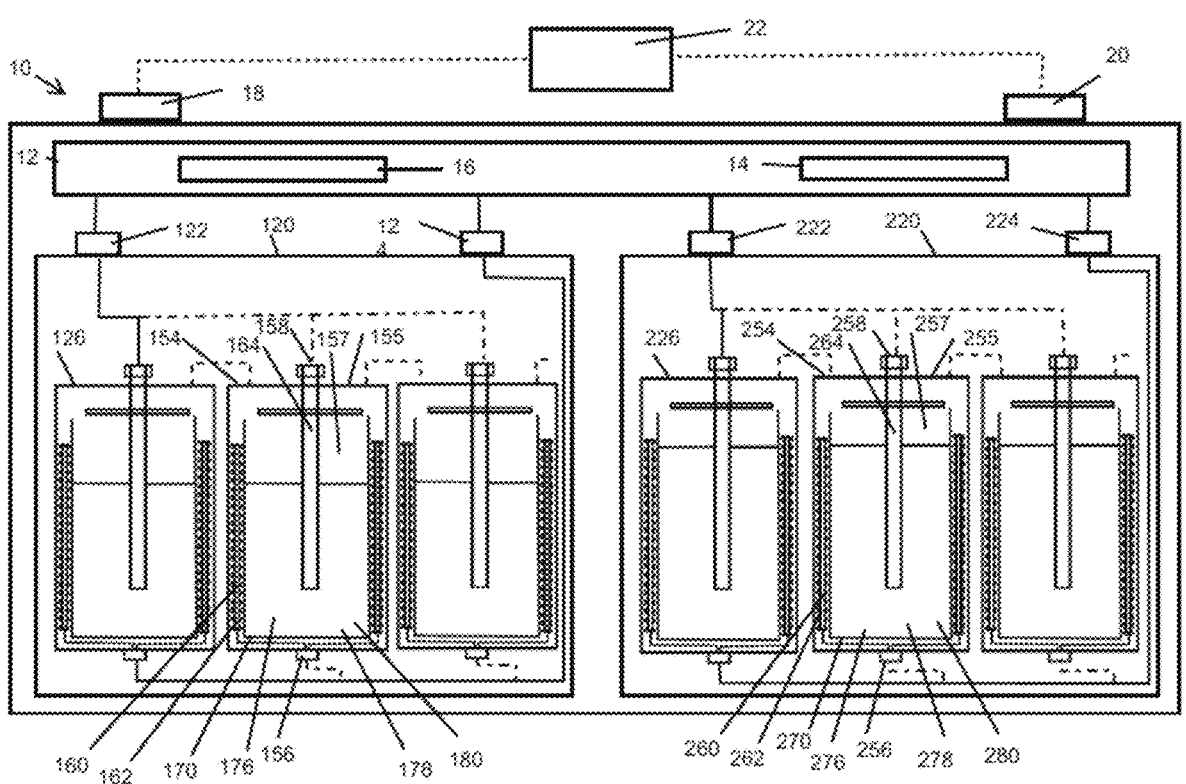
FIG. 3 is a schematic view of another embodiment of the present invention for a hybrid battery pack system.

The hybrid battery system 10 is shown in FIGS. 1 and 3. The hybrid battery system 10 includes a primary battery pack 120, a secondary battery pack 220, a battery control unit 12 being in communication with the primary battery pack and the secondary battery pack, a battery pack positive terminal 18 connected to the battery control unit, and a battery pack negative terminal 20 connected to the battery control unit. Embodiments of the battery control unit 12 are comprised of a management module 14 and a variable resistor 16. The primary battery pack 120 is compatible with lower temperatures, and the secondary battery pack 220 is compatible with higher temperatures. The battery control unit 12 manages the power supplied from each battery pack 120, 220 through the extended range of temperatures from the surface to the bottom of the borehole so that sufficient power is provided to the downhole tool from the primary battery pack 120, the secondary battery pack 220 or both.

Embodiments of the hybrid battery system 10 of the present invention include a lithium-oxyhalide battery as the primary battery pack 120 and a lithium alloy-oxyhalide battery as the secondary battery pack 220. In the prior art, a hybrid battery with a lithium-oxyhalide battery is explosive and unsafe at higher temperatures, and a hybrid battery with a lithium alloy-oxyhalide battery fails to provide sufficient power at lower temperatures. The hybrid battery system 10 enables these previously flawed batteries in a single combination that is safe to operate.

Figure 2:
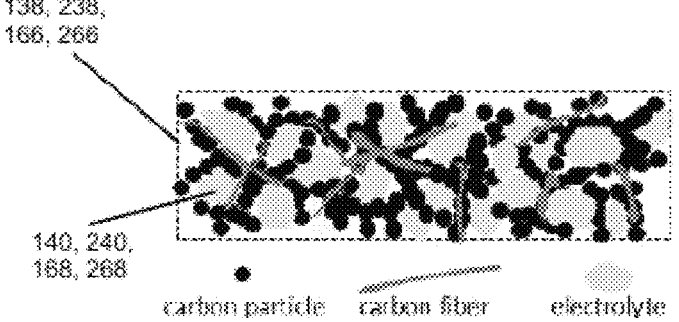
FIG. 2 is a schematic view of an embodiment of each carbon electrode of the battery system according to the present invention.

FIGS. 1-3 show a primary battery pack 120 being comprised of a primary negative terminal 122 and a primary positive terminal 124. The primary battery pack 120 includes a primary first battery cell 126 being comprised of a primary first negative terminal 128 connected to the primary negative terminal 122 and a primary first positive terminal 130 connected to the primary positive terminal 124. The primary battery pack 120 also includes a primary first negative electrode 132 being comprised of a primary first electrode metal 134 and being connected to the primary first negative terminal, and a primary first carbon electrode 136. As shown in FIG. 2, the primary first carbon electrode 136, being comprised of primary first carbon materials 138, is connected to the primary first positive terminal and has porous structures 140. FIGS. 1 and 3 show a primary first separator 142 between the primary first negative electrode and the primary first carbon electrode. There is a primary first cathodic solution 148 within the primary first battery cell 126 and in contact with the primary first negative electrode, the primary first separator, and the primary first carbon electrode. In FIGS. 1 and 3, the primary first cathodic solution comprises a primary first solvent system 150 and a primary first electrolyte salt 152. FIGS. 1 and 3 are only schematic views of the cells 126, 154, 226, 254, the "positive electrode" of each cell may actually include more space within the primary first battery housing 155 than shown schematically. For example, all spaces containing the primary first cathodic solution 148 and any porous surfaces in the primary first separator 142 filled with the primary first electrolyte salt 152. The "positive electrode" is not just the primary first carbon electrode 136.

FIGS. 1-3 also shows a secondary battery pack 220 being comprised of a secondary negative terminal 222 and a secondary positive terminal 224. The secondary battery pack 220 includes a secondary first battery cell 226 being comprised of a secondary first negative terminal 228 connected to the secondary negative terminal and a secondary first positive terminal 230 connected to the secondary positive terminal. The secondary battery pack 220 includes a secondary first negative electrode 232 being comprised of a secondary first electrode metal 234 and being connected to the secondary first negative terminal, and a secondary first carbon electrode 236. FIG. 2 also shows the secondary first carbon electrode 236 being comprised of secondary first carbon materials 238 and having porous structures 240. The secondary first carbon electrode 236 is connected to the secondary first positive terminal. FIGS. 1 and 3 show a secondary first separator 242 between the secondary first negative electrode and the secondary first carbon electrode. There is a secondary first cathodic solution 248 within the battery cell and in contact with the secondary first negative electrode, the secondary first separator, and the secondary first carbon electrode. In FIGS. 1 and 3, the secondary first cathodic solution comprises a secondary first solvent system 250 and a secondary first electrolyte salt 252.

The hybrid battery system 10 of the present invention includes the primary battery pack 120 with particular relatedness to the secondary battery pack 220 in order to operate safely. In embodiment of the present invention, the primary first electrode metal has a primary first melting point, and the primary first battery cell has a primary first rated temperature range. Correspondingly, the secondary first electrode metal has a secondary first melting point, and the secondary first battery cell has a secondary first rated temperature range. In the present invention, the rated temperature range (primary first rated temperature range, secondary first rated temperature range) is the temperature range corresponding to the cell discharging useful power to an external device, typically cell voltage above 2.0V. The rated temperature range is generally below the corresponding melting point, such as the primary first rated temperature range being below the primary first melting point. The secondary first rated temperature range is higher than the primary first rated range. Furthermore, the primary first negative electrode metal has a primary first electrode metal charge capacity, and the primary first cathodic solution has a primary first positive charge capacity. In the present invention, the primary first electrode metal charge capacity is lower than the primary first positive charge capacity. Additionally, the primary first battery cell 126 is comprised of a primary first battery housing 127 with a primary first battery headspace 129, and the secondary first battery cell 226 is comprised of a secondary first battery housing 227 with a secondary first battery headspace 229. In the present invention, a primary first battery headspace percentage of the primary first battery housing is greater than a secondary first battery headspace percentage of the secondary first battery housing. The proportion or ratio of the primary first battery headspace to the primary first battery housing is greater than the proportion or ratio of the secondary first battery headspace to the secondary first battery housing. FIGS. 1-3 show the primary first battery headspace 129 being greater than the secondary first battery headspace 229 schematically.

The safety and efficacy of the hybrid battery system 10 is assured by the relationships between the primary battery pack 120 relative to the secondary battery pack 220. The primary battery pack 120 has the lower primary first rated temperature range, which can correspond to an alkaline metal or an alkaline earth metal as the primary first negative electrode 132. The secondary battery pack 220 has the higher secondary first rated temperature range, which can correspond to an alkaline metal alloy or an alkaline earth metal alloy or alkaline metal—alkaline earth metal alloy as the secondary first negative electrode 232.

Embodiments of the present invention include the primary first carbon electrode 136 and the secondary first carbon electrode 236 being further comprised of inert polymer binders, and the primary first separator 142 and the secondary first separator 242 being comprised of one of a group consisting of: glass fiber and a polymer, such as polypropylene or polyethylene. Embodiments of the present invention also include the primary first solvent system 150 and the secondary first solvent system 250, each being comprised of at least one of a group consisting of thionyl chloride and sulfuryl chloride. The primary first electrolyte salt 152 and the secondary first electrolyte salt 252 can also be comprised of at least one of a group consisting of metal tetrachloroaluminate, metal tetrachlorogallate, Metal tetrachloroborate, metal bis(oxalato)borate, metal bis(trifluoromethanesulfonyl)imide, and metal trifluoromethanesulfonate, metal tetrafluoroborate, and metal hexafluoroarsenate.

There are also embodiments with the primary first cathodic solution 148 being further comprised of a co-solvent with a boiling point higher than a boiling point of the primary first solvent system 150. For example, the co-solvent can have a boiling point higher than 150 deg C. when a primary first solvent system 150 is thionyl chloride (boiling point 75 deg C.) or sulfuryl chloride (boiling point 69 deg C.). The co-solvent can raise the boiling point of the primary first cathodic solution 148 so that internal pressure in the primary first battery cell 12 is reduced even when primary first electrode metal 134 remains as residual primary first electrode metal at temperatures above the primary first rated temperature range. The primary first battery cell 126 is more stable at temperatures above the primary first rated temperature range and at temperatures above the primary first melting point of the primary first electrode metal 134. The co-solvent is preferred to have an inert reactivity or low reactivity with the primary first electrode metal 134. The co-solvent dilutes reactive components of primary first cathodic solution 148, such as thionyl chloride or sulfuryl chloride of the primary first solvent system 150. The reactivity between primary first cathodic solution 148 and any molten residual primary first electrode metal 134 is now reduced at temperatures above the primary first rated temperature range and at temperatures above the primary first melting point. The co-solvent can be comprised of at least one of a group consisting of nitrobenzene, 2-nitro-m-xylene, 4-nitro-m-xylene, benzoyl chloride, 2-methylben-zoyl chloride, ethylene (glycol) sulfite, dimethyl sulfoxide, trimethyl phosphate, benzonitrile, methyl benzoate, gamma-butyrolactone, propylene carbonate, 3-methoxy propioni-trile, and N, N-dimethylformamide for embodiments of the co-solvent having a boiling point over 150 deg C. Alternate embodiments include the co-solvent as 1-nitropropane, thio-phosphoryl chloride, 3-methyl-2-oxazolidinone, acetoni-trile, carbon tetrachloride, trichloromethane, and dime-thoxyethane, wherein the co-solvent has a boiling point at least higher than the boiling point of the primary first solvent system 150. For a primary first solvent system 150 with a boiling point lower than 150 deg C., these other embodi-ments of the co-solvent are available.

FIGS. 1-3 also show the primary first negative electrode being further comprised of a primary first porous transition metal layer 144 pressed on the primary first electrode metal 134. For example, Ni foam can be the primary first porous transition metal layer 144, and Li metal foil can be the primary electrode metal 134. FIGS. 1-3 show embodiments with the primary first porous transition metal layer 144 on both sides of the primary electrode metal 134, although the invention only requires one primary first porous transition metal layer 144. Both Ni foam and Li metal foil are soft, and Ni foam is porous. The Li metal can be pressed into pores of Ni foam layers. The total thickness of the primary first negative electrode 132 can be substantially lower than total thickness of three layers, due to high porosity of Nickel foam (can be >90%). This embodiment of the primary first negative electrode 132 has a better anode metal connection with primary first negative terminal 128 to minimize any anode metal portions losing electric connection. The pressed connection of the primary first electrode metal 134 into pores exposes more residual anode metal to be stripped. This construction increases safety of the primary battery pack 120 at temperatures above the primary first rated temperature range with the primary first electrode metal 134 more easily stripped. The primary first porous transition metal layer 144 can be a porous layer or multiple layers of a transition metal, like nickel, formed as a cloth, mesh, foam, or other form with pores.

FIG. 1 shows the primary battery pack 120 with one primary first battery cell 126 and additional primary cells. FIG. 3 shows a fully recited version of the hybrid battery system 10 with more than one cell in each battery pack 120, 220. The cells are modular. The primary cells are inter-changeable with each other. The secondary cells are inter-changeable with each other. The primary cells are not interchangeable and modular with the secondary cells. The cells are modular and interchangeable within each battery pack, not across battery packs. Each type of cell can be connected in series or in parallel. FIG. 3 shows the primary battery pack 120 further comprising a primary second bat-tery cell 154, a primary second negative electrode 160, a primary second carbon electrode 164, a primary second separator 170, and a primary second cathodic solution 176. The primary second battery cell 154 is connected to the primary first battery cell 120 and can be connected in series or in parallel to the primary first battery cell 126. Both types of connections are indicated schematically by dashed lines in FIG. 3.

The primary first battery cell 120 and the primary second battery cell 154 are modular and have similar relationships to the secondary first battery cell 220. The primary second battery cell 154 must also be compatible with lower tem-peratures, like the primary first battery cell 126, correspond-ing to the primary first rated temperature range and below the secondary first rated temperature range. The primary second electrode metal 162 has a primary second melting point. The primary second battery cell 154 has a primary second rated temperature range, and the secondary first rated temperature range is higher than the primary second rated range. The primary second electrode metal 162 has a pri-mary second electrode metal charge capacity, and the pri-mary second cathodic solution 176 has a primary second positive charge capacity. The primary second electrode metal charge capacity is lower than the primary second positive charge capacity. The primary second battery cell 154 is comprised of a primary second battery housing 155 with a primary second battery headspace 157. The primary second battery headspace percentage of the primary second battery housing 155 is greater than a secondary first battery headspace percentage of the secondary first battery housing 227. The proportion or ratio of the primary second battery headspace 157 to the primary second battery housing 155 is greater than the proportion or ratio of the secondary first battery headspace 229 to the secondary first battery housing 227.

The components of the primary second battery cell 154 are directly analogous to the primary first battery cell 12. The primary second battery cell 154 is comprised of a primary second negative terminal 156 connected to the primary negative terminal 122 and a primary second positive terminal 158 connected to the primary positive terminal 124. The connections can be in series or parallel with the primary first battery cell 126. FIG. 3 shows the connections in parallel in broken lines and indicate a connection in series in other broken lines. The primary second negative electrode is comprised of a primary second electrode metal 162 and being connected to the primary second negative terminal. The primary second carbon electrode 164 is comprised of primary second carbon materials 166 and connected to the primary second positive terminal. The primary second car-bon electrode has porous structures 168. The primary second separator 170 is also between the primary second negative electrode and the primary second carbon electrode. The primary second cathodic solution 176 is within the primary second battery cell and in contact with the primary second negative electrode, the primary second separator, and the primary second carbon electrode. The primary second cathodic solution comprises a primary second solvent system 178 and a primary second electrolyte salt 180.

FIG. 1 shows the secondary battery pack 220 with one secondary first battery cell 226 and additional secondary cells. FIG. 3 shows a fully recited version of the hybrid battery system 10 with more than one cell in each battery pack 120, 220. The cells are modular and interchanges within battery packs 120, 220. FIG. 3 shows the secondary battery pack 220 further comprising a secondary second battery cell 254, a secondary second negative electrode 260, a secondary second carbon electrode 264, a secondary second separator 270, and a secondary second cathodic solution 276. The secondary second battery cell 254 is connected to the secondary first battery cell 220 in series or in parallel. Both types of connections are in FIG. 3, a parallel connection is shown in broken lines and a series connection is indicated by other broken lines.

The secondary first battery cell 220 and the secondary second battery cell 254 are modular and have similar relationships to the primary first battery cell 120 (and primary second battery cell 154). The secondary second battery cell 254 must also be compatible with higher temperatures, like the secondary first battery cell 226, corresponding to temperatures above the primary first rated temperature range and the primary second rated temperature range. The secondary second electrode metal 262 has a secondary second melting point. The secondary second battery cell 254 has a secondary second rated temperature range, and the secondary second rated temperature range is higher than the primary first rated range (and the primary second rated range). The secondary second electrode metal 262 has a secondary second electrode metal charge capacity, and the secondary second cathodic solution 276 has a secondary second positive charge capacity. The secondary second battery cell 254 is comprised of a secondary second battery housing 255 with a secondary second battery headspace 257. The proportion or ratio of the primary first battery headspace 127 to the primary first battery housing 129 is greater than the proportion or ratio of the secondary second battery headspace 257 to the secondary second battery housing 255.

The components of the secondary second battery cell 254 are directly analogous to the secondary first battery cell 220. The secondary second battery cell 254 is comprised of a secondary second negative terminal 256 connected to the secondary negative terminal 222 and a secondary second positive terminal 258 connected to the secondary positive terminal 224. The connections can be in series or parallel with the secondary first battery cell 226. FIG. 3 shows the connections in parallel in broken lines and indicates a connection in series in other broken lines. The secondary second negative electrode is comprised of a secondary second electrode metal 262 and being connected to the secondary second negative terminal. The secondary second carbon electrode 264 is comprised of secondary second carbon materials 266 and connected to the secondary second positive terminal. The secondary second carbon electrode has porous structures 268. The secondary second separator 270 is also between the secondary second negative electrode and the secondary second carbon electrode. The secondary second cathodic solution 276 is within the secondary second battery cell and in contact with the secondary second negative electrode, the secondary second separator, and the secondary second carbon electrode. The secondary second cathodic solution comprises a secondary second solvent system 278 and a secondary second electrolyte salt 280.

Figure 4:
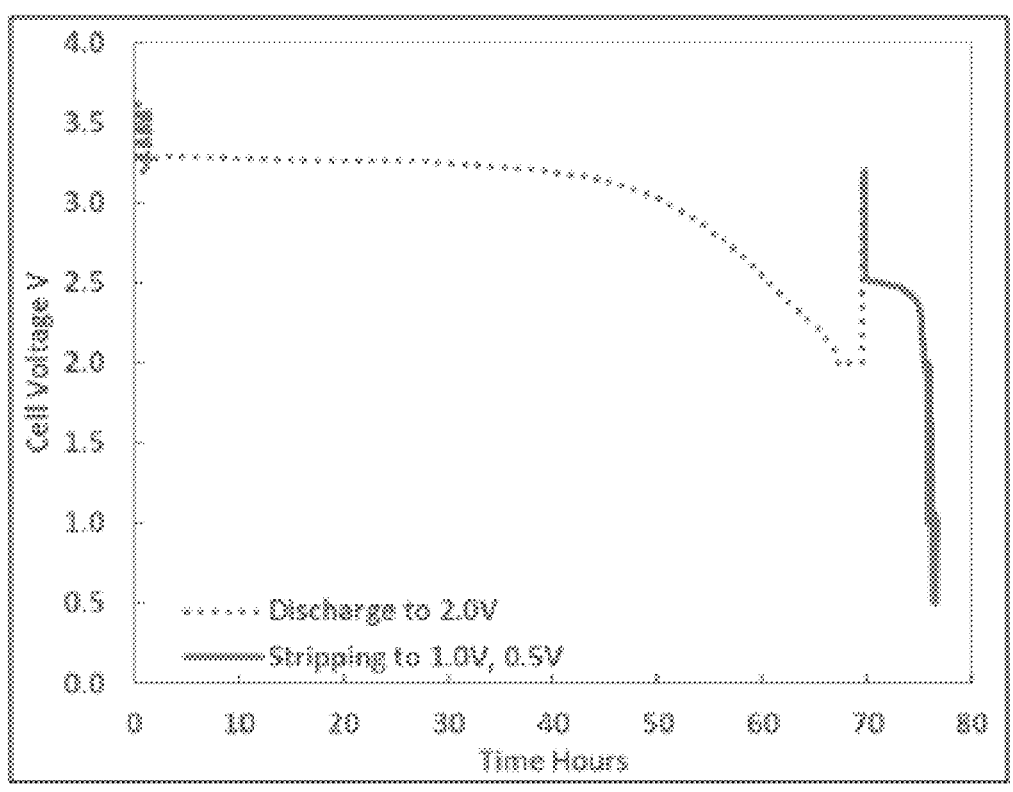
FIG. 4 is a graph illustration of cell voltage over time, showing the method of the present invention.

Embodiments of the present invention include the method for powering, according to FIGS. 1, 3 and 4. The method includes connecting an external electric application device 22 of a downhole tool to the hybrid battery system 10 at the battery pack positive terminal 18 and at the battery pack negative terminal 20 and measuring a monitored temperature of the hybrid battery system 10. The method includes generating a primary first voltage discharge level by reactions with the primary first electrode metal 134 and the primary first cathodic solution 148, when the monitored temperature is within the primary first rated temperature range; and generating a secondary first voltage discharge level by reactions with the secondary first electrode metal 234 and the secondary first cathodic solution 248, when the monitored temperature is within the secondary first rated temperature range.

The downhole tool is deployed into a borehole, and the monitored temperature will change. Specifically, the monitored temperature will increase. Near the surface, generating the primary first discharge level is the main power supply due to the monitored temperature being relatively low. Deploying deeper in the borehole, the primary first discharge level and the secondary first discharge level may supply power due to the monitored temperature being in both the primary first rated temperature range and the secondary first rated temperature range. Even further into the borehole, the monitored temperature will be high. Instead of switching off or releasing the primary battery pack 120 to return to the surface, the method of the present invention increases resistance of the variable resistor 16 with the management module before the monitored temperature is greater than the primary first rated temperature range.

The method of the present invention includes stripping the primary first electrode metal 134 from the primary first battery cell 126 before the monitored temperature exceeds the primary first rated temperature range, as shown in FIG. 4. The primary battery pack 120 is stripped for safety, instead of simply being switched off. Embodiments of the method include the steps of: disconnecting the external device from the primary battery pack 120 before connecting the variable resistor 16 to the primary battery pack 120 and the step of increasing resistance. The resistance of the variable resistor 16 can be increased as the monitored temperature approaches the higher end of the primary first rated temperature range. The amount of increase can depend on how quickly the monitored temperature is reaching the end of the primary first rated temperature range. The downhole tool may also be slowed from lowering further into the borehole (and higher temperatures downhole) so that the step of stripping can be completed before the downhole tool can continue lowering into the borehole.

There are different embodiments of the method, after step of stripping the primary first electrode metal 134. In one embodiment, the next step is disconnecting the primary battery pack 120. The step of stripping has fully discharged the primary first battery cell 126, and there is no longer any primary first electrode metal 134 remaining. Thus, the primary first battery cell 126 is safe to proceed with the downhole tool, even if the temperatures are higher than the primary first rated temperature range and higher than the primary first melting point. As a practical matter, it is unlikely to remove all primary first electrode metal 134. Thus, in another embodiment, the primary first cathodic solution 148 is further comprised of: a co-solvent with a boiling point higher than a boiling point of the primary first solvent system 150. The method further includes dissolving the primary first electrolyte salt 152 in the primary first solvent system 150 with higher boiling point co-solvent so at to minimize internal vapor pressure of the primary first battery cell 126. The method further includes reducing any residual primary first electrode metal 134 with the primary first cathodic solution 148 to release heat and accumulate internal electrolyte vapor in the primary first battery headspace 129. These steps avoid an internal temperature spike in the primary battery cell 126, even when the temperatures are above the primary first rated temperature range and above the primary first melting point. The larger primary first battery headspace 129 further reduces cell internal pressure. These additional measures allow the safe continuation of the primary battery pack 120 in the hybrid battery system 10, even when the monitored temperature is above the primary first rated temperature range and above the primary first melting point.

Embodiments of the method of the present invention include the primary first voltage discharge level being greater than 2.0V in the step of generating the primary first voltage discharge level. FIG. 4 remains consistent with this embodiment. The monitored temperature remains within the primary first rated temperature range, but the power level still must be sufficient to power the external electric application device 22. A sufficient power level to power the external application device 22 is typically when average cell voltage in the primary battery pack 120 is greater than 2.0V. In a related embodiment, the method includes decreasing the primary first voltage discharge level from greater than 2.0V. This step occurs if the primary battery pack 120 simply runs out of power, even though the monitored temperature remains within the primary first rated temperature range. In this related embodiment, there is still primary first electrode metal 134 remaining, even though useful power is no longer being generated. For safety, this primary first electrode metal 134 still needs to be addressed. Thus, the related method includes increasing resistance of the variable resistor connected to the primary battery pack with the management module when the primary first voltage discharge level is less than 2.0V, and stripping the primary first electrode metal 134 from the primary first battery cell when the primary first voltage discharge level is less than 2.0V. In this related embodiment, the management module 14 spikes the variable resistor 16 on the basis of discharge level, not just monitored temperature. A primary battery pack 120 that has been drained of effective voltage discharge must be further processed to a safe and stable state.

The method for powering also includes the steps for more than one cell in a battery pack. In FIG. 3, there is the primary second battery cell 154 and the secondary second battery cell 254. In this embodiment with multiple cells, the method further includes generating a primary second voltage discharge level by reactions with the primary second electrode metal 162 and the primary second cathodic solution 176, when the monitored temperature is within the primary second rated temperature range. The primary first battery cell 126 and primary second battery cell 154 of the primary battery pack 120 are modular and interchangeable within the primary battery pack 120, and the secondary first battery cell 226 and the secondary second battery cell 254 of the secondary battery pack 220 are modular and interchangeable within the secondary battery pack 220. The step of increasing resistance of the variable resistor 16 to the primary battery pack 120 with said management module 14 is now before the monitored temperature is greater than the primary first rated temperature range and before the monitored temperature is greater than the primary second rated temperature range. Some embodiments can still include the steps of disconnecting the primary battery pack 120 from the external device 22 and connecting the variable resistor 16 to the primary battery pack 120 before the step of increasing resistance. The primary first battery cell 126 and primary second battery cell 154 are both disconnected from the external device 22, connected to the variable resistor 16, and stripped together as the primary battery pack 120. Thus, an additional step of stripping the primary second electrode metal 162 from the primary second battery cell 154 is also before the monitored temperature exceeds the primary second rated temperature range. Adding the secondary second battery cell 254 is cumulative with the secondary first battery cell 220. All of the primary cells of the primary battery pack 120 must be stripped. None of the secondary cells of the secondary battery pack 220 require the analogous step of stripping.

Now that there is the step of stripping the primary first electrode metal 134 and the step of stripping the primary second electrode metal 162, the next steps are analogous for each cell of the first battery pack 120. The next step can be disconnecting the primary battery pack 120. The steps of stripping have fully discharged the primary first battery cell 126 and the primary second battery cell 154. There is no longer any primary first electrode metal 134 or primary second electrode metal 162 remaining. Thus, the primary first battery cell 126 and the primary second battery cell 154 are safe to proceed with the downhole tool, even if the temperatures are higher than the primary first melting point and the primary second melting point. Again, as a practical matter, it is unlikely to remove all primary first electrode metal 134 and all primary second electrode metal 162. The steps of stripping stop, and the primary first battery cell 126 and the primary second battery cell 154 are made safe and stable.

In addition to the monitored temperature, the management module 14 can also set the resistance of the variable resistor 16 according to voltage discharge. However, there are now multiple cells, and individual monitoring of cell voltage is not efficient enough for present invention. When the primary second voltage discharge level is greater than 2.0V in the step of generating the primary second voltage, the method further includes decreasing the primary second voltage discharge level from greater than 2.0V. In the embodiment with multiple cells, the step of increasing resistance of the variable resistor 16 with the management module 14 is now when the average primary discharge level is less than 2.0V. Then, the primary second electrode metal 162 is stripped from the primary second battery cell 154, along with the primary first electrode metal 134 being stripped from the primary first battery cell 126. Again, the resistance of the variable resistor 16 can be spiked for the primary battery pack 120 and all primary cells 126, 154 in the primary battery pack 120 based on either voltage discharge or monitored temperature.

Embodiments of the present invention include Examples 1a-6 of components of the present invention as shown in FIGS. 1-4.

Example 1a: A Primary First Battery Cell 126

A DD-size Li—SOCl2 battery cell is fabricated with 19.5 Ah (theoretical capacity or primary first electrode metal charge capacity) lithium metal as the primary first electrode metal 134. The primary first cathodic solution 148 contains 1.0 M LiAlCl4 salt as the primary first electrolyte salt 152 in a mixed SOCl2 (primary first solvent system 150) and nitrobenzene (2:1 ratio by volume) (co-solvent). Thionyl chloride SOCl2 has a theoretical capacity or primary first positive charge capacity of 21 Ah. The Example 1a primary first battery cell 126 has a rated capacity 17.6 Ah at 165 deg C.

Example 1 b: A Primary First Battery Cell 126

A DD-size Li—SOCl2 battery cell is fabricated with 15.6 Ah (theoretical capacity or primary first electrode metal charge capacity) lithium metal as the primary first electrode metal 134. The primary first cathodic solution 148 contains 1.0 M LiAlCl4 salt the primary first electrolyte salt 152 in mixed SOCl2 (primary first solvent system 150) and benzoyl chloride (3:2 ratio by volume) (co-solvent). Thionyl chloride SOCl2 has a theoretical capacity or primary first positive charge capacity of 17 Ah. The Example 1b primary first battery cell 126 has a rated capacity 14.43 Ah at 165 deg C.

Example 1a and Example 1b are primary first battery cells 126 that can provide full power from −40 deg C. to 165 deg C. (primary first rated temperature range), or until a discharge cutoff voltage of 2.0V as in FIG. 4 or both. Further, the fully discharged (stripped) cells can safely survive an environmental temperature up to 225 deg C. (above the primary first rated temperature range and above the primary first melting point) without a need to be removed in drilling tools.

Example 2: A Secondary First Battery Cell 226

A battery cell as the secondary first battery cell 226 including a Li alloy as the secondary first electrode metal 234 for the secondary first negative electrode 232 and SOCl2 as the secondary first solvent system 250 is commercially available. A DD-size secondary first battery cell 226 having Li—Mg alloy as the secondary first electrode metal 234 and SOCl2 as the secondary first solvent system 250, has a rated capacity of 21 Ah at 200 deg C. and can provide full power to underground tools from 100 deg C. to 200 deg C. (secondary first rated temperature range).

Example 3a: A Primary Battery Pack 120

There are 8 DD-size Example 1a battery cells (primary first battery cell 126, primary second battery cell 154, . . . ) connected in series to form a primary battery pack 120 for lower temperatures, that is, each of the primary battery cells, including the primary first battery cell 126, has a primary first rated temperature range in lower temperatures than the secondary battery pack 220. The primary battery pack 120 has a rated capacity of 17.6 Ah and a working voltage 16-29 V at 165 deg C. The primary battery pack 120 can provide full power to an underground tool in a temperature range of −40 deg C. to 165 deg C. as the primary first rated temperature range.

Example 3b: A Primary Battery Pack 120

There are 10 DD-size Example 1 b battery cells (primary first battery cell 126, primary second battery cell 154, . . . ) connected in 5S2P configuration (two group of cells connected in parallel, each group with 5 cells connected in series) to form a primary battery pack 120 for lower temperatures, that is, each of the primary battery cells, including the primary first battery cell 126, has a primary first rated temperature range in lower temperatures than the secondary battery pack 220. The primary battery pack 120 has a rated capacity of 28.9 Ah and a working voltage 10-18 V at 165 deg C. The primary battery pack 120 can provide full power to an underground tool in a temperature range of −40 deg C. to 165 deg C. as the primary first rated temperature range.

Example 4: A Secondary Battery Pack 220

There are 10 DD-size Example 2 battery cells (secondary first battery cell 226, secondary second battery cell 254, . . . ) connected in series to form a secondary battery pack 220 for higher temperatures, that is, each of the secondary battery cells, including the secondary first battery cell 226, has a secondary first rated temperature range in higher temperatures than the primary battery pack 120. The secondary battery pack 220 has a rated capacity of 21 Ah at 200 deg C. and a working voltage about 20-36 V. The secondary battery pack 220 can provide full power to an underground tool in a temperature range of 100 deg C. to 200 deg C. as the secondary first rated temperature range.

Example 5a: Variable Resistor 16

In addition to a conventional management module 14 for basic thermal and electric functions, the battery control unit 12 includes a variable resistor 16, which can be used for the step of stripping the primary battery pack 120.

The variable resistor 16 can be comprised of four resistors of 160, 320, 640, and 1280 Ohms, and each resistor can be connected or disconnected to the primary battery pack 120 for the step of stripping.

Example 5b: Variable Resistor 16

The variable resistor 16 can be comprised of four resistors of 62.5, 125, 250, and 500 Ohms, and each resistor can be connected or disconnected to the primary battery pack for the step of stripping.

Example 6: Hybrid Battery System 10

The hybrid battery system 10 is utilized to power a measuring while drilling (MWD) tool for an oil well drilling application. At the start of drilling, the hybrid battery system 10 may experience an environmental temperature possibly as low as −40 deg C. or 20 deg C. The primary battery pack 120 with the lower primary first rated temperature range (Example 3a, Example 3b) in the hybrid battery system 10 provides full power to the MWD tool. With the increase of well depth during drilling, environmental temperature or the monitored temperature for the hybrid battery system 10 increases. The primary battery pack 120 (Example 3a, Example 3b) continues to power the MWD tool, until the primary discharge voltage, including the primary first discharge voltage, drops to 8×2.0V=16 V (example 3a) or 5×2.0V=10 V (example 3b). At this point, the hybrid battery pack system 10 experiences an environmental temperature of 100-165 deg C. as the monitored temperature. The primary battery pack 120 is disconnected from the MWD tool, and secondary battery pack 220 is connected to provide full power to the MWD tool. The primary battery pack 120 is connected to the variable resistor 16 and starts to be further discharged until a desired cutoff discharge voltage reached, similarly as in FIG. 4.

In one embodiment of a primary first battery cell 126 (example 1b), a Li—SOCl2 single cell (primary first electrode metal 134 is lithium, primary first solvent system 150 is thionyl chloride) was first discharged to 2.0 V with 90.4% theoretical capacity or primary first electrode metal capacity of lithium metal utilized. It took about 6 hours to be further discharged (stripped) to 1.0 V and final 0.5 V with constant resistor loadings, as shown in FIG. 4. During the step of stripping, an additional 3.7% theoretical capacity of lithium metal was consumed. Hence, about 94.1% theoretical capacity of lithium metal was consumed, or there is 5.9% of lithium metal that could remained in the primary first battery cell 126. If sufficient time is allowed before monitored temperature reaches the primary first melting point, extended stripping beyond 6 hours may further reduce amount of residual lithium metal with cell voltage decreased below 0.5 V. Ideally, 100% of lithium metal would be consumed, but some lithium metal residual may be electrically disconnected from primary first negative electrode 132 and will not be consumed during stripping step. Safety requires additional modification to address any remaining or leftover primary first electrode metal 134. The present invention include a co-solvent to raise boiling temperature of the primary first cathodic solution 148, a primary first porous layer pressed on the primary first electrode metal, and the primary first battery headspace 129 being greater than the secondary first battery headspace 229.

The primary battery pack 120 being connected to the variable resistor 16 and starting to be further discharged can include embodiments of the primary battery pack 120 being discharged to 8×0.5 V=4 V or lower with stripping by the variable resistor 16 increased from 160, to 320, to 640, to 1280 Ohms (Example 3a, Example 5a). Alternatively, the primary battery pack 120 is discharged to 5×0.5V=2.5V or lower, each step with stripping by the variable resistor 16 increased from 62.5, to 125, to 250, to 500 Ohms (Example 3b, Example 5b).

The primary battery pack 120 is fully discharged or stripped to remove negative electrode metal, such as lithium. The primary battery pack 120 can be disconnected from resistor load of the variable resistor 16, before environmental temperature or the monitored temperature rises above 165 deg C.

Embodiments of the method include temporarily pausing the step of deploying deeper into the borehole to avoid further temperatures increase above 165 deg C. until the step of stripping is completed to safe conditions. During the step of stripping, the monitored temperature may reach 165 deg C. The method includes holding the hybrid battery system 10 in position to avoid higher temperatures, until the step of stripping is completed.

The present invention provides sufficient and reliable battery power for a wider range of downhole temperature conditions. As a hybrid system, the present invention keeps the benefit of lithium based battery cells for lower temperatures without the extreme safety risks, like explosions, as the drilling continues downward under higher temperatures. The practical and theoretical capacity of the primary electrode metal is lower than the same capacity of the primary cathodic solution of each primary cell to further ensure complete stripping of the primary electrode metal. There will be little, if any, primary electrode metal to be addressed for the continued exposure to higher temperatures.

For any remaining primary electrode metal, the present invention further provides greater headspace in the primary cells than secondary battery cells. The primary cells can handle more internal vapor pressure of remaining reactants. The primary solvent systems can also include co-solvents with a high boiling point to stabilize the primary cathodic solutions as the temperature continues to increase past the primary rated temperature range of the primary cells. The electrode metal can have a porous layer of transition metal to further increase the stripping of the electrode metal.

The present invention includes the method for power management so that the hybrid battery system remains safe for operating in downhole conditions. The control unit and variable resistor perform the step of stripping based on monitored temperature and based on voltage discharge. Monitored temperature is not the only criteria to simply switch power supply from the secondary battery pack and disconnecting the primary battery pack. The method for the step of stripping is the opposite of prior art step of disconnecting as the monitored temperature increases. There are additional steps to stabilize the primary battery pack, even as the temperatures continue to increase as drilling proceeds downward with the secondary battery pack.

The foregoing disclosure and description of the invention is illustrative and explanatory thereof. Various changes in the details of the illustrated structures, construction and method can be made without departing from the true spirit of the invention.

We claim:

1. A method for powering, comprising the steps of:
   connecting an external electric application device of a downhole tool to a hybrid battery system, at said battery pack positive terminal and at said battery pack negative terminal,
   wherein the hybrid battery system comprises:
   a primary battery pack being comprised of a primary negative terminal and a primary positive terminal, the primary battery pack comprising:
   a primary first battery cell being comprised of a primary first negative terminal connected to the primary negative terminal and a primary first positive terminal connected to the primary positive terminal;
   a primary first negative electrode being comprised of a primary first electrode metal and being connected to the primary first negative terminal;
   a primary first carbon electrode being comprised of primary first carbon materials and being connected to the primary first positive terminal, the primary first carbon electrode having porous structures;
   a primary first separator between the primary first negative electrode and the primary first carbon electrode; and
   a primary first cathodic solution being within said primary first battery cell and in contact with said primary first negative electrode, said primary first separator, and said primary first carbon electrode,
   wherein the primary first cathodic solution comprises a primary first solvent system and a primary first electrolyte salt;
   a secondary battery pack being comprised of a secondary negative terminal and a secondary positive terminal, the secondary battery pack comprising:
   a secondary first battery cell being comprised of a secondary first negative terminal connected to the secondary negative terminal and a secondary first positive terminal connected to the secondary positive terminal;
   a secondary first negative electrode being comprised of a secondary first electrode metal and being connected to the secondary first negative terminal;

a secondary first carbon electrode being comprised of secondary first carbon materials and being connected to the secondary first positive terminal, the secondary first carbon electrode having porous structures;

a secondary first separator between the secondary first negative electrode and the secondary first carbon electrode; and a secondary first cathodic solution being within said secondary first battery cell and in contact with said secondary first negative electrode, said secondary first separator, and said secondary first carbon electrode, wherein the secondary first cathodic solution comprises a secondary first solvent system and a secondary first electrolyte salt, wherein the primary first electrode metal has a primary first melting point, wherein the primary first battery cell has a primary first rated temperature range;

wherein the secondary first electrode metal has a secondary first melting point, wherein the secondary first battery cell has a secondary first rated temperature range;

wherein the secondary first rated temperature range is higher than the primary first rated temperature range, wherein the primary first electrode metal has a primary first electrode metal charge capacity, wherein the primary first cathodic solution has a primary first positive charge capacity, wherein the primary first electrode metal charge capacity is lower than the primary first positive charge capacity, wherein the primary first battery cell is comprised of a primary first battery housing with a primary first battery headspace, wherein the secondary first battery cell is comprised of a secondary first battery housing with a secondary first battery headspace, and wherein a primary first battery headspace percentage of said primary first battery housing is greater than a secondary first battery headspace percentage of said secondary first battery housing;

a battery control unit being in communication with the primary battery pack and the secondary battery pack, the battery control unit being comprised of a management module and a variable resistor;

a battery pack positive terminal connected to the battery control unit; and a battery pack negative terminal connected to the battery control unit;

measuring a monitored temperature of the hybrid battery system;

generating a primary first voltage discharge level by reactions with the primary first electrode metal and the primary first cathodic solution, when the monitored temperature is within the primary first rated temperature range;

deploying the downhole tool into a borehole;

generating a secondary first voltage discharge level by reactions with the secondary first electrode metal and the secondary first cathodic solution, when the monitored temperature is within the secondary first rated temperature range;

increasing resistance of the variable resistor to the primary battery pack with the management module before the monitored temperature is greater than the primary first rated temperature range; and stripping the primary first electrode metal from the primary first battery cell before the monitored temperature exceeds the primary first rated temperature range.

2. The method for powering, according to claim 1, further comprising the step of:

disconnecting the external device from said primary battery pack before the step of increasing resistance; and connecting said variable resistor to said primary battery pack before the step of increasing resistance.

3. The method for powering, according to claim 1, wherein the primary first cathodic solution is further comprised of a co-solvent with a boiling point higher a boiling point of said primary first solvent system.

4. The method for powering, according to claim 3, further comprising the step of:

dissolving the primary first electrolyte salt in the primary first cathodic solution so at to minimize internal vapor pressure of the primary first battery cell.

5. The method for powering, according to claim 1, further comprising the step of:

reducing any residual primary first electrode metal within the primary first cathodic solution so as to accumulate internal electrolyte vapor in said primary first battery headspace.

6. The method for powering, according to claim 1, wherein the primary first voltage discharge level is greater than 2.0V in the step of generating the primary first voltage discharge level.

7. The method for powering, according to claim 6, further comprising the steps of:

decreasing the primary first voltage discharge level from greater than 2.0V;

increasing resistance of the variable resistor with the management module when the primary first voltage discharge level is less than 2.0V; and stripping the primary first electrode metal from the primary first battery cell when the primary first voltage discharge level is less than 2.0V.

8. A method for powering, comprising the steps of:

connecting an external electric application device of a downhole tool to a hybrid battery system, at the battery pack negative terminal and at the battery pack positive terminal, wherein the hybrid battery system comprises:

a primary battery pack being comprised of a primary negative terminal and a primary positive terminal, the primary battery pack comprising:

a primary first battery cell being comprised of a primary first negative terminal connected to the primary negative terminal and a primary first positive terminal connected to the primary positive terminal;

a primary first negative electrode being comprised of a primary first electrode metal and being connected to the primary first negative terminal;

a primary first carbon electrode being comprised of primary first carbon materials and being connected to the primary first positive terminal, the primary first carbon electrode having porous structures;

a primary first separator between the primary first negative electrode and the primary first carbon electrode; and a primary first cathodic solution being within said primary first battery cell and in contact with said primary first negative electrode, said primary first separator, and said primary first carbon electrode, wherein the primary first cathodic solution comprises a primary first solvent system and a primary first electrolyte salt;

a secondary battery pack being comprised of a secondary negative terminal and a secondary positive terminal, the secondary battery pack comprising:

a secondary first battery cell being comprised of a secondary first negative terminal connected to the secondary negative terminal and a secondary first positive terminal connected to the secondary positive terminal;

a secondary first negative electrode being comprised of a secondary first electrode metal and being connected to the secondary first negative terminal;

a secondary first carbon electrode being comprised of secondary first carbon materials and being connected to the secondary first positive terminal, the secondary first carbon electrode having porous structures;

a secondary first separator between the secondary first negative electrode and the secondary first carbon electrode; and a secondary first cathodic solution being within said secondary first battery cell and in contact with said secondary first negative electrode, said secondary first separator, and said secondary first carbon electrode, wherein the secondary first cathodic solution comprises a secondary first solvent system and a secondary first electrolyte salt, wherein the primary first electrode metal has a primary first melting point, wherein the primary first battery cell has a primary first rated temperature range;

wherein the secondary first electrode metal has a secondary first melting point, wherein the secondary first battery cell has a secondary first rated temperature range;

wherein the secondary first rated temperature range is higher than the primary first rated temperature range, wherein the primary first electrode metal has a primary first electrode metal charge capacity wherein the primary first cathodic solution has a primary first positive charge capacity, wherein the primary first electrode metal charge capacity is lower than the primary first positive charge capacity, wherein the primary first battery cell is comprised of a primary first battery housing with a primary first battery headspace, wherein the secondary first battery cell is comprised of a secondary first battery housing with a secondary first battery headspace, and wherein a primary first battery headspace percentage of said primary first battery housing is greater than a secondary first battery headspace percentage of said secondary first battery housing;

a battery control unit being in communication with the primary battery pack and the secondary battery pack, the battery control unit being comprised of a management module and a variable resistor;

a battery pack positive terminal connected to the battery control unit; and a battery pack negative terminal connected to the battery control unit, wherein the primary battery pack further comprises:

a primary second battery cell being comprised of a primary second negative terminal connected to the primary negative terminal and a primary second positive terminal connected to the primary positive terminal;

a primary second negative electrode being comprised of a primary second electrode metal and being connected to the primary second negative terminal;

a primary second carbon electrode being comprised of primary second carbon materials and being connected to the primary second positive terminal, the primary second carbon electrode having porous structures;

a primary second separator between the primary second negative electrode and the primary second carbon electrode; and a primary second cathodic solution being within said primary second battery cell and in contact with said primary second negative electrode, said primary second separator, and said primary second carbon electrode, wherein the primary second cathodic solution comprises a primary second solvent system and a primary second electrolyte salt, wherein the primary second battery cell is connected to the primary first battery cell, wherein the primary second electrode metal has a primary second melting point, wherein the primary second battery cell has a primary second rated temperature range, wherein the secondary first rated temperature range is higher than the primary second rated temperature range, wherein the primary second electrode metal has a primary second electrode metal charge capacity, wherein the primary second cathodic solution has a primary second positive charge capacity, wherein the primary second electrode metal charge capacity is lower than the primary second positive charge capacity, wherein the primary second battery cell is comprised of a primary second battery housing with a primary second battery headspace, and wherein a primary second battery headspace percentage of said primary second battery housing is greater than the secondary first battery headspace percentage of said secondary first battery housing;

measuring a monitored temperature of the hybrid battery system;

generating a primary first voltage discharge level by reactions with the primary first electrode metal and the primary first cathodic solution, when the monitored temperature is within the primary first rated temperature range;

generating a primary second voltage discharge level by reactions with the primary second electrode metal and the primary second cathodic solution, when the monitored temperature is within the primary second rated temperature range;

deploying the downhole tool into a borehole;

generating a secondary first voltage discharge level by reactions with the secondary first electrode metal and the secondary first cathodic solution, when the monitored temperature is within the secondary first rated temperature range;

increasing resistance of the variable resistor to the primary battery pack with the management module before the monitored temperature is greater than the primary first rated temperature range and before the monitored temperature is greater than the primary second rated temperature range; and stripping the primary first electrode metal from the primary first battery cell before the monitored temperature exceeds the primary first melting point; and stripping the primary second electrode metal from the primary second battery cell before the monitored temperature exceeds the primary second melting point.

9. The method for powering, according to claim 8, further comprising the step of:

disconnecting the external device from said primary battery packbefore the step of increasing resistance; and connecting said variable resistor to said primary battery pack before the step of increasing resistance.

10. The method for powering, according to claim 8, wherein an average primary discharge level of the primary first voltage discharge level and the primary second voltage discharge level is greater than 2.0V, the method further comprising the steps of:

decreasing the primary first voltage discharge level from greater than 2.0V;

decreasing the primary second voltage discharge level from greater than 2.0V;

increasing resistance of the variable resistor with the management module when said average primary discharge level is less than 2.0V; and stripping the primary first electrode metal from the primary first battery cell when said average primary discharge level is less than 2.0V; and stripping the primary second electrode metal from the primary second battery cell when said average primary voltage discharge level is less than 2.0V.

\* \* \* \* \*